United States Patent
Tsirkin

(10) Patent No.: US 11,150,887 B2
(45) Date of Patent: Oct. 19, 2021

(54) SECURE CODE PATCHING

(71) Applicant: Red Hat, Inc., Raleigh, NC (US)

(72) Inventor: Michael Tsirkin, Westford, MA (US)

(73) Assignee: RED HAT, INC., Raleigh, NC (US)

(*) Notice: Subject to any disclaimer, the term of this patent is extended or adjusted under 35 U.S.C. 154(b) by 28 days.

(21) Appl. No.: 16/589,385

(22) Filed: Oct. 1, 2019

(65) Prior Publication Data

US 2021/0096839 A1   Apr. 1, 2021

(51) Int. Cl.
| | |
|---|---|
| G06F 9/44 | (2018.01) |
| G06F 8/65 | (2018.01) |
| G06F 12/14 | (2006.01) |
| G06F 9/30 | (2018.01) |
| G06F 8/41 | (2018.01) |
| G06F 12/1009 | (2016.01) |

(52) U.S. Cl.
CPC .......... *G06F 8/65* (2013.01); *G06F 8/41* (2013.01); *G06F 9/30076* (2013.01); *G06F 12/1009* (2013.01); *G06F 12/1441* (2013.01)

(58) Field of Classification Search
None
See application file for complete search history.

(56) References Cited

U.S. PATENT DOCUMENTS

| | | | | |
|---|---|---|---|---|
| 8,607,208 B1* | 12/2013 | Arnold | ............. | G06F 8/656 |
| | | | | 717/153 |
| 9,164,754 B1* | 10/2015 | Pohlack | ............. | G06F 8/658 |
| 9,244,854 B2 | 1/2016 | Gschwind | | |
| 9,785,352 B2 | 10/2017 | Gschwind | | |
| 10,083,129 B2* | 9/2018 | Tsirkin | ............. | G06F 9/45558 |
| 10,255,088 B2 | 4/2019 | Tsirkin | | |
| 2018/0113817 A1 | 4/2018 | Banginwar et al. | | |
| 2019/0278636 A1* | 9/2019 | Dabak | ............. | G06F 9/44594 |
| 2020/0081847 A1* | 3/2020 | Oster | ............. | G06F 9/45558 |

OTHER PUBLICATIONS

Werner, et al.; No-Execute-After-Read: Preventing Code Disclosure in Commodity Software; Pub. May 30, 2016 to Jun. 3, 2016; 12 pages. https://www.cs.unc.edu/~jjwerner/near-asiaccs.pdf.

* cited by examiner

*Primary Examiner* — Qamrun Nahar
(74) *Attorney, Agent, or Firm* — Haynes and Boone, LLP

(57) ABSTRACT

According to one example, a method performed by a computing system, the method includes, with a privileged component of the computing system, loading patching code to a region of memory. The method further includes, in relation to executing the patching code, switching from a first set of page tables to a second set of page tables, wherein the second set of pages tables is configured such that only the patching code is executable and privileged memory is writable. The method further includes, executing the patching code to update code stored in memory subject to a predefined set of constraints.

20 Claims, 5 Drawing Sheets

SECURE CODE PATCHING

BACKGROUND

The present disclosure relates generally to code patching, and more particularly, mechanisms used to patch code in a secure manner.

Computing systems often use privileged software components such as a kernel. A kernel is a piece of software that that abstracts the hardware so that applications running on the systems do not have to be concerned with hardware details. This is particularly important because the applications may be intended to run on various types of devices, both local and remote. The kernel translates the requests into data processing instructions for the processor and other components of a computer. The kernel also ensures that different applications running on a computer system do not have access to each other's program code except through proper channels. This helps ensure that malicious code does not adversely affect various applications.

The kernel makes use of privileged memory, which may also be referred to as kernel memory. Privileged memory is a designated portion of a computing system's volatile memory space. Kernel memory is typically write-protected for security purposes. By write-protecting kernel memory, malicious code cannot make changes to important and secure features stored within kernel memory. However, sometimes it may be desirable to make authorized changes to code stored within kernel memory. However, disabling write-protect for kernel memory exposes the kernel to security risks.

SUMMARY

According to one example, a method performed by a computing system, the method includes, with a privileged component of the computing system, loading patching code to a region of memory. The method further includes, in relation to executing the patching code, switching from a first set of page tables to a second set of page tables, wherein the second set of pages tables is configured such that only the patching code is executable and privileged memory is writable. The method further includes, executing the patching code to update code stored in memory subject to a predefined set of constraints.

According to one example, a method includes, with a kernel of the computing system, loading patching code to a region of memory, providing executable access to the patching code while disabling executable access for all other code, while providing executable access to the patching code, providing write access to other portions of privileged memory, receiving a request from the patching code to update a portion of privileged code within the other portions of the privileged memory, and validating that the request to update a portion of kernel code is valid.

A computing system includes a processor, and a memory comprising machine readable instructions that when executed by the processor cause the system to load patching code to a region of memory, in relation to executing the patching code, switch from a first set of page tables to a second set of page tables, wherein the second set of pages tables is configured such that only the patching code is executable and privileged memory is writable, and execute the patching code to update code stored in memory subject to a predefined set of constraints.

Figure 1:
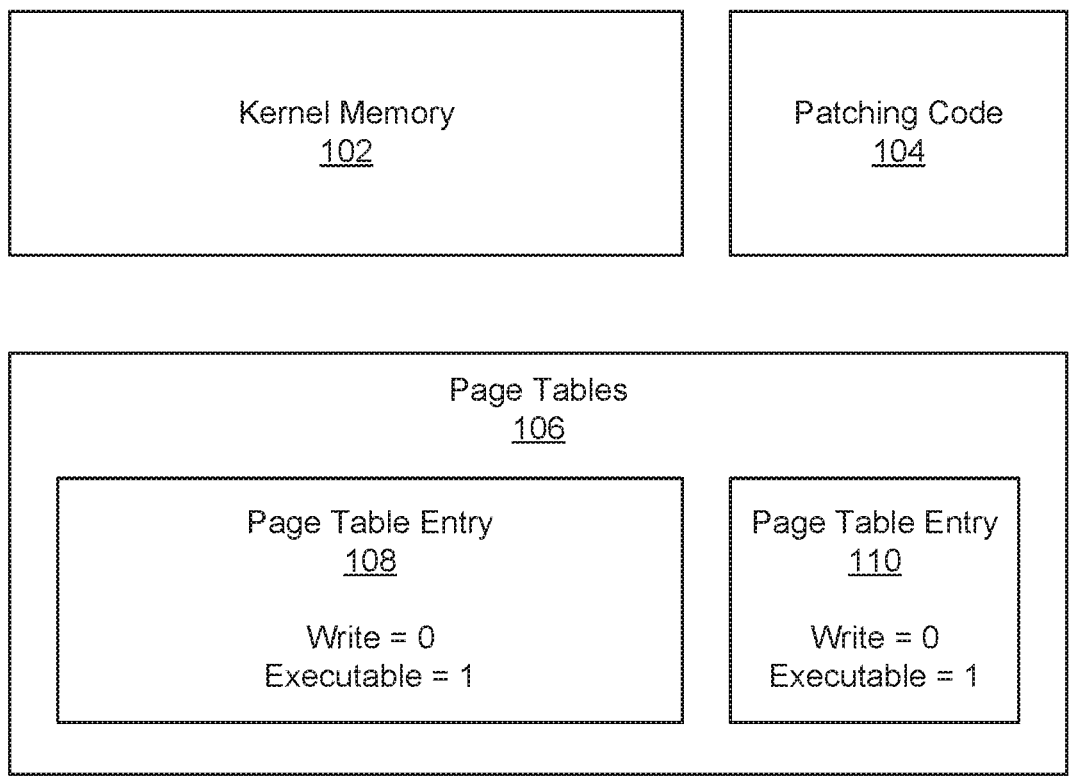
FIG. 1 is a diagram showing an illustrative set of page tables associated with kernel memory, according to one example of principles described herein.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it may be desirable to make authorized changes to code stored within privileged memory such as kernel memory. However, disabling write-protect for kernel memory exposes the kernel to security risks. Moreover, write-protection mechanisms for memory systems are done at page-level granularity. Specifically, a particular page can have various write permissions but sub-sections of that page cannot have one set of permissions while other sub-sets of that page have another set of permissions. Thus, even when updating code that covers a relatively small portion of memory corresponding to a particular page, the entire page has to be exposed to write privileges to allow the update.

To address this issue, principles described herein are directed to enabling patching code that may securely update specified memory regions rather than entire pages. To do this, a portion of privileged code stored in privileged memory (i.e., the kernel code stored in kernel memory) may be designated as patching code. The patching code may be designated, for example, by a compiler or linker during the compilation process. A privileged component such as a kernel may then load the patching code into a separate page-aligned memory region. After placing the patching code into the separate page-aligned memory region, the page(s) covering the patching code are write-protected.

When the patching code is invoked, the patching code is given write access to protected memory, and regular code is denied write access to kernel memory. In one example, to do this, the kernel creates an alternative set of page tables. The alternative set of page tables provides executable access to only the patching code. In other words, executable access to all other portions of memory besides the patching code is disables. Additionally, the alternative set of page tables allows write access to the kernel memory. Thus, while the alternative set of page tables is in use, only the patching code has the ability to overwrite kernel memory. The patching code may then use that write-access to update kernel code. For example, the patching code may insert jump labels or tracepoints into the kernel code.

When updating kernel code, the patching code may be subject to a set of constraints. For example, the patching code may only be allowed to update code within a specified memory range. In this way, the patching code can safely update code at a more granular level than the page level. Other constraints may be applied. For example, the patching code may only be able to replace NOP instructions. Additionally or alternatively, only a specified set of updates may be allowed.

FIG. 1 is a diagram showing an illustrative set of page tables 108 associated with kernel memory 102. Computing systems often utilize virtual memory. With virtual memory, applications are presented with a virtual address space. The kernel then uses page tables to map the virtual address space to a physical space. This provides many advantages because the virtual address space may be larger than the physical memory space. The virtual address space is divided into different regions referred to as pages. Each page corresponds to a region of physical memory. That region of physical memory may be swapped out between volatile memory and non-volatile memory to accommodate the size difference between the virtual address space and the physical address space.

Each page within memory can be assigned various permissions. A page with write permissions allows certain applications to write to the memory within that page. A page with executable permissions allows code stored within that memory page to be executed by a processor. Memory management systems are not typically designed to grant different permissions to different memory regions within a page. Rather, permissions are granted at the page level.

As mentioned above, the kernel is a core component of the computing system's operating system. When a computing system is first started up and power is provided to volatile memory, the kernel is often the first application to be loaded into volatile memory. The code for the kernel is placed into a region of memory called the kernel memory 102. Kernel memory is write-protected. In other words, the page table entry 108 that maps the virtual address space to the physical kernel memory 102 is write-protected. That way, malicious code is not able to make adjustments to the kernel.

However, it may be desirable to make authorized updates to the kernel. Patching code 104 is used to make authorized updates to the kernel. The patching code 104 is a set of code that when executed can change kernel code within kernel memory 102. For example, the patching code 104 may update jump labels or tracepoints within the kernel code. Tracepoints may include, but are not limited to such as scheduling events, interrupts, memory-mapped I/O, CPU power state transitions, and operations related to file systems and virtualization.

In some examples, the kernel may load the patching code 104 into a separate page-aligned memory region. After the patching code 104 has been placed into this separate page-aligned memory region, that memory region can be write-protected. Specifically, the page table entry 110 associated with that region may have write permissions disabled.

FIG. 1 illustrates a default set of page tables 106. The default set includes a page table entry 108 for the kernel memory 102 and a page table entry 108 for the patching code. Both page table entries provide executable permission to kernel memory 102 and the patching code 104. And, both page table entries 108, 110 prohibit write permissions to kernel memory 102 and the patching code 104.

Figure 2:
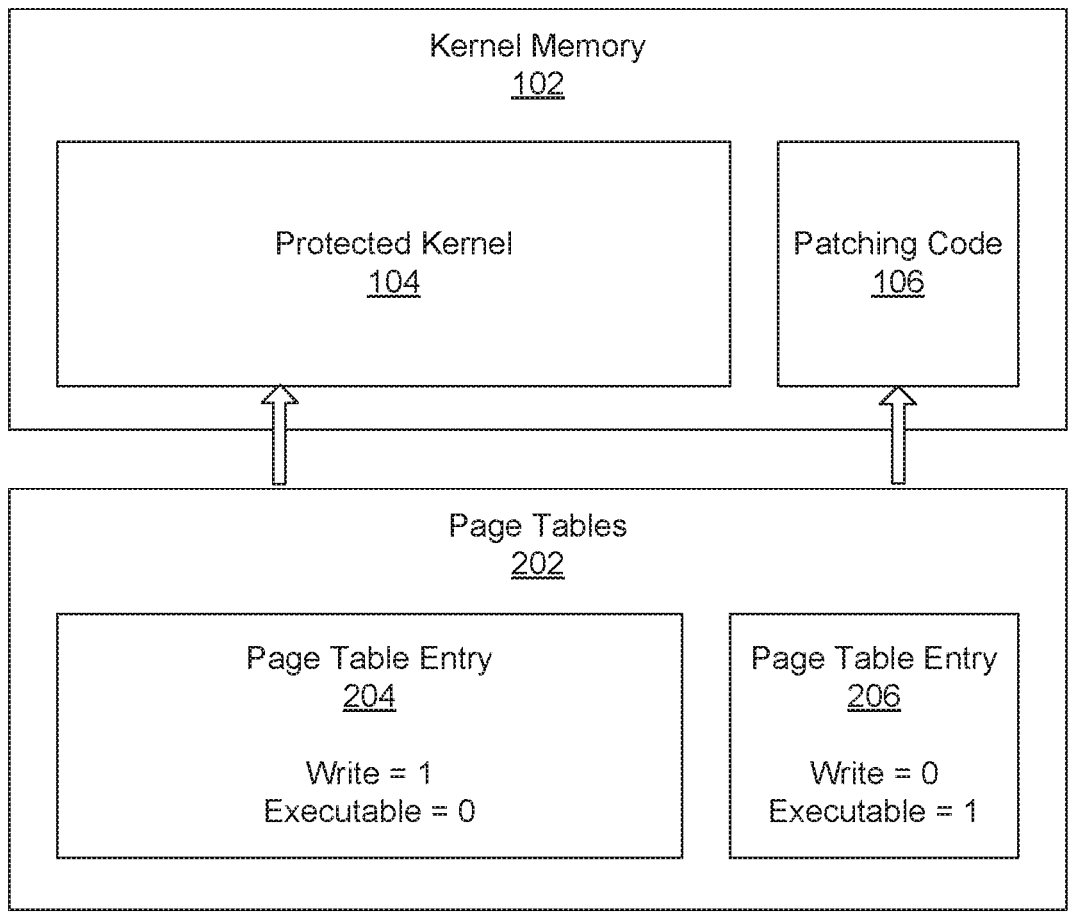
FIG. 2 is a diagram showing an illustrative alternative set of page tables associated with kernel memory, according to one example of principles described herein.

FIG. 2 is a diagram showing an illustrative alternative set of page tables associated with kernel memory. When the patching code 104 is invoked through proper channels, the kernel memory is made writeable and only the patching code is made executable. In one example, to do this, the kernel switches to use of the alternative set of page tables 202. In the alternative set of page tables 202, page table entry 204 disables executable permissions to the kernel memory 102 and grants write access to kernel memory 204. Page table entry 204 provides executable privileges to the patching code 104 and maintains write-protection for the patching code 104.

Figure 3:
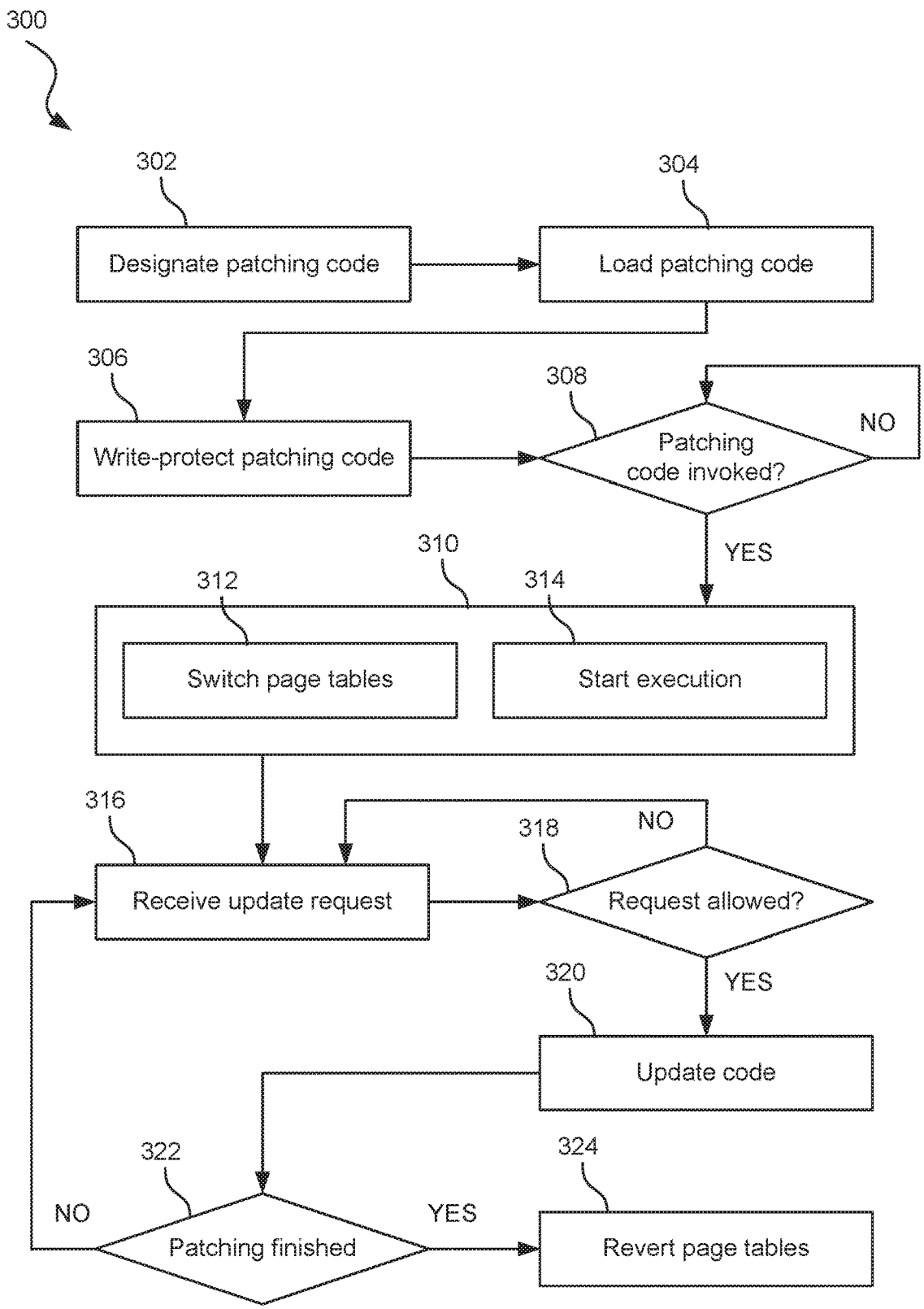
FIG. 3 is a flowchart showing an illustrative method for securely updating kernel code by using an alternative set of page tables, according to one example of principles described herein.

FIG. 3 is a flowchart showing an illustrative method for securely updating kernel code by using an alternative set of page tables. According to the present example, the method 300 includes a process 302 for designating patching code. Patching code may be designated as such by a compiler or a linker that compiles and links the kernel. The patching code may be placed in a separate text modifying section of the kernel executable. As mentioned above, patching code is used to update portions of the kernel. For example, various executable instructions may be replaced with different executable instructions. In some cases, for example, a NOP instruction may be replaced with a different instruction. Additionally, jump labels may be updated. A jump instruction tells the processor to jump to a different section of code (identified by a label) and start executing code at that location.

The method 300 further includes a process 304 for loading the patching code into a separate page-aligned memory region. In some examples, the patching code may be loaded into a region that has been allocated for use by the kernel. In some examples, the patching code may be loaded into another region of memory. At the time the patching code is loaded into the separate page-aligned memory region, that memory region is not write protected in order to allow the loading.

The method 300 further includes a process 306 for write-protecting the patching code. More specifically, the page table entry for the page corresponding to the memory region containing the patching code has write privileges disabled. Thus, malicious code is not able to make alterations to the patching code.

The method 300 further includes a process 308 for determining whether the patching code has been invoked. In other words, it is determined whether a function has called the patching code. If it is determined at process 308 that the patching code has not been invoked, then the kernel continues execution as normal and performs its normal duties. If, however, it is determined at process 308 that patching code has indeed been invoked, then the method 300 proceeds to process 310.

Process 310 includes a process 312 for switching page tables and a process 314 for starting execution of the patching code. In some examples, process 312 may happen before process 314. In some examples, however, process 312 may occur after process 314 has started.

The process 312 involves switching page tables to change permissions for specific regions of memory. Specifically, the kernel may switch from a first or default set of page tables to a second or specialized set of page tables. The default page tables (e.g., 106, FIG. 1) include page table entries that provide executable privileges to the kernel code and prohibit write access. Conversely, the specialized set of page table disable executable privileges to the kernel code and allow write access to the kernel code. Executable privileges for the patching code remain, however. Thus, only the patching code has executable instructions. And the kernel memory is now writable. In some examples, all memory may be writable according to the specialized set of page tables.

The process 314 involves starting execution of the patching code. As mentioned above, the page tables may be switched before the kernel code is executed. In other words, calling the patching code may also trigger switching of the page tables. In some examples, however, the patching code begins execution and then the page tables are switched. In some examples, a hypervisor may verify that the current set of pages tables is the specialized set rather than the default set. If so, the hypervisor may allow writing only if the specialized set of page tables is in use.

The method 300 further includes a process 316 for receiving an update request. In other words, the patching code may request that the system update a line of code in kernel memory. This may be, for example, a request to update a jump label, add a tracepoint, or update a page table entry.

The method 300 further includes a process 318 for determining whether the request is allowed. This may be done through a variety of mechanisms. For example, the request to update code may be subject to a set of constraints. These constraints may be stored within a write-protected data structure stored somewhere in memory. This write-protected data structure may stay write-protected even when the specialized set of page tables are used.

Various constraints may be placed on the patching code. In some examples, the patching code may only update specified memory range addresses. In this manner, modification of kernel code is limited by customized ranges and is not limited at page-level granularity. In some examples, the system may verify the current contents of the memory region for which the update request seeks to overwrite. It may be that only some types of executable instructions are allowed to be overwritten. For example, it may be that tracepoints may be inserted where there are currently NOP instructions. The constraints may also involve comparing a jump label that is being requested to be added to jump labels that are known at build time. This insures that a new jump label does not point to a maliciously added piece of code. The constraints may also involve ensuring that updates to page table entries are valid by ensuring that the page table entries are pointed to from legitimate page tables.

If it is determined at process 318 that the requested update is not allowed, then the system prohibits the request from being completed. In some examples, this may trigger an exit from the patching code and return to use of the original page tables. In some examples, however, the system still remains in the patching code and waits for a subsequent request. If it is determined at process 318 that the request is allowed, then the method proceeds to process 320.

The method further includes a process 320 for updating the code. Specifically, the section of code identified in the request is updated according to the request. A jump label may be updated or added, a tracepoint may be updated or added, page table entries may be updated, etc.

The method 300 further includes a process 322 for determining whether the patching code is finished with requests. If it is determined that the patching code is not finished, then the method 300 returns to step 316, at which an additional request is received. If, however, it is determined at process 322 that the patching code is finished, then the method 300 proceeds to process 324.

The method 300 further includes a process 324 for reverting the page tables. Specifically, the page tables are switched back from the specialized set of page tables to the default set of page tables. This causes write access to the kernel code to be disabled and allows executable access to the kernel code. Execution of the kernel code may then continue as normal.

Figure 4:
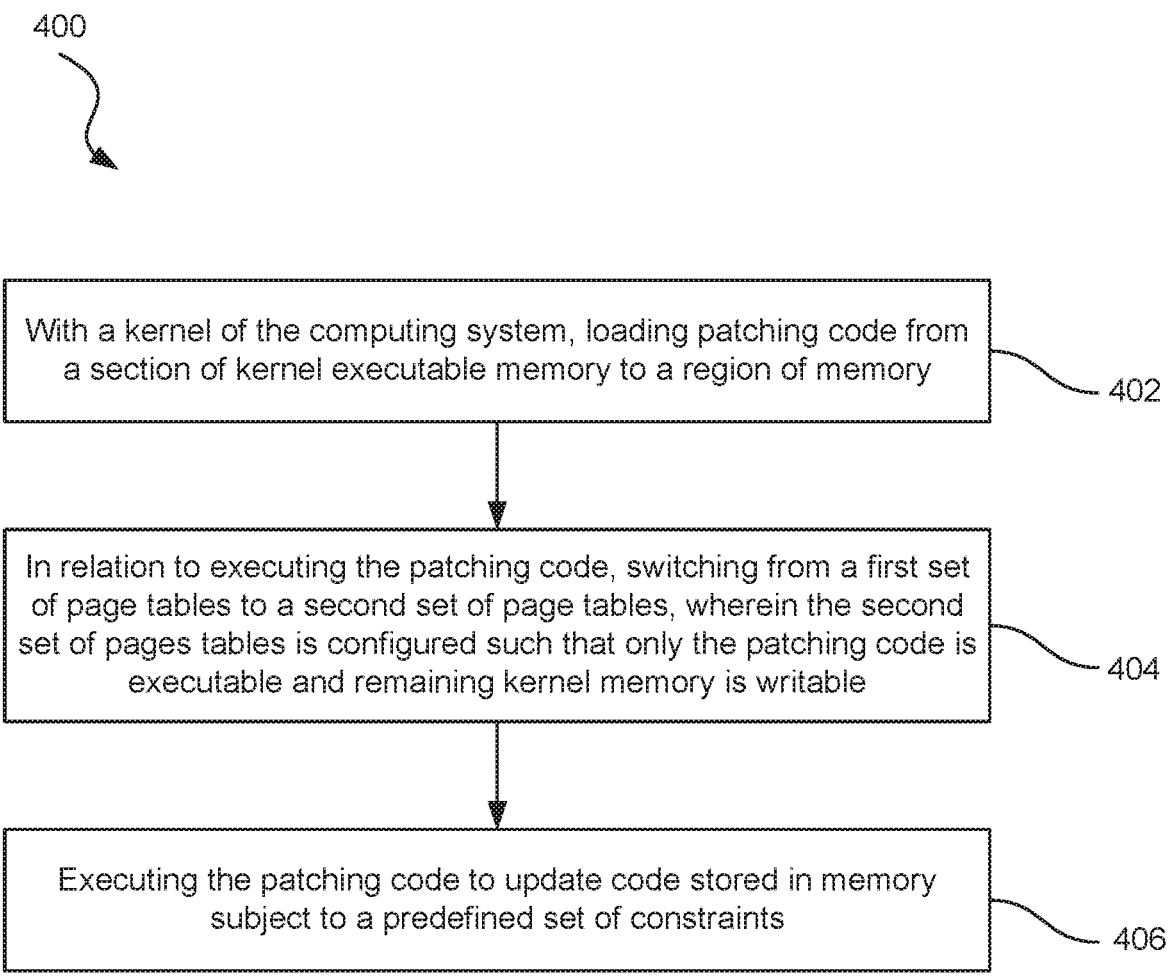
FIG. 4 is a flowchart showing an illustrative method for securely updating kernel code, according to one example of principles described herein.

FIG. 4 is a flowchart showing an illustrative method 400 for securely updating kernel code. According to the present example, the method includes a process 402 for, with a kernel of the computing system, loading patching code from a section of kernel executable memory to a region of memory. As explained above, the patching code may be designated as such by a compiler and may be configured to make various updates to kernel code. Such updates include, but are not limited to, updating jump labels, updating page table entries or adding tracepoints. After loading the patching code to the region of memory, the region of memory may be write-protected.

The method 400 further includes a process 404 for, in relation to executing the patching code, switching from a first set of page tables to a second set of page tables, wherein the second set of pages tables is configured such that only the patching code is executable and remaining kernel memory is writable. In some examples, other portions of memory outside kernel memory may be writable as well. In some examples, the page tables may be switched from the first set of page tables to the second set of page tables before the patching code begins execution or before the patching code is invoked. For example, the function or code that calls the patching code may execute a command to switch the page tables before the patching code begins execution. In other words, after the patching code has been called and before it begins execution, the page tables may be switched. In some examples, however, switching the page tables may be switched after the patching code begins execution.

The method 400 further includes a process for executing the patching code to update code stored in memory subject to a predefined set of constraints. These constraints may be stored within a write-protected data structure stored somewhere in memory. This write-protected data structure may stay write-protected even when the specialized set of page tables are used. Various constraints may be placed on the patching code. In some examples, the patching code may only update specified memory range addresses. In this manner, modification of kernel code is limited by customized ranges and is not limited at page-level granularity. In some examples, the system may verify the current contents of the memory region for which the update request seeks to overwrite. It may be that only some types of executable instructions are allowed to be overwritten. For example, it may be that tracepoints may be inserted where there are currently NOP instructions. The constraints may also involve comparing a jump label that is being requested to be added to jump labels that are known at build time. This insures that a new jump label does not point to a maliciously added piece of code. The constraints may also involve ensuring that updates to page table entries are valid by ensuring that the page table entries are pointed to from legitimate page tables.

After updating the kernel code with the patching code, the system can switch back to the first set of page tables. Thus, the kernel memory will again become executable and write-protected. This allows kernel operation to continue as normal.

Figure 5:
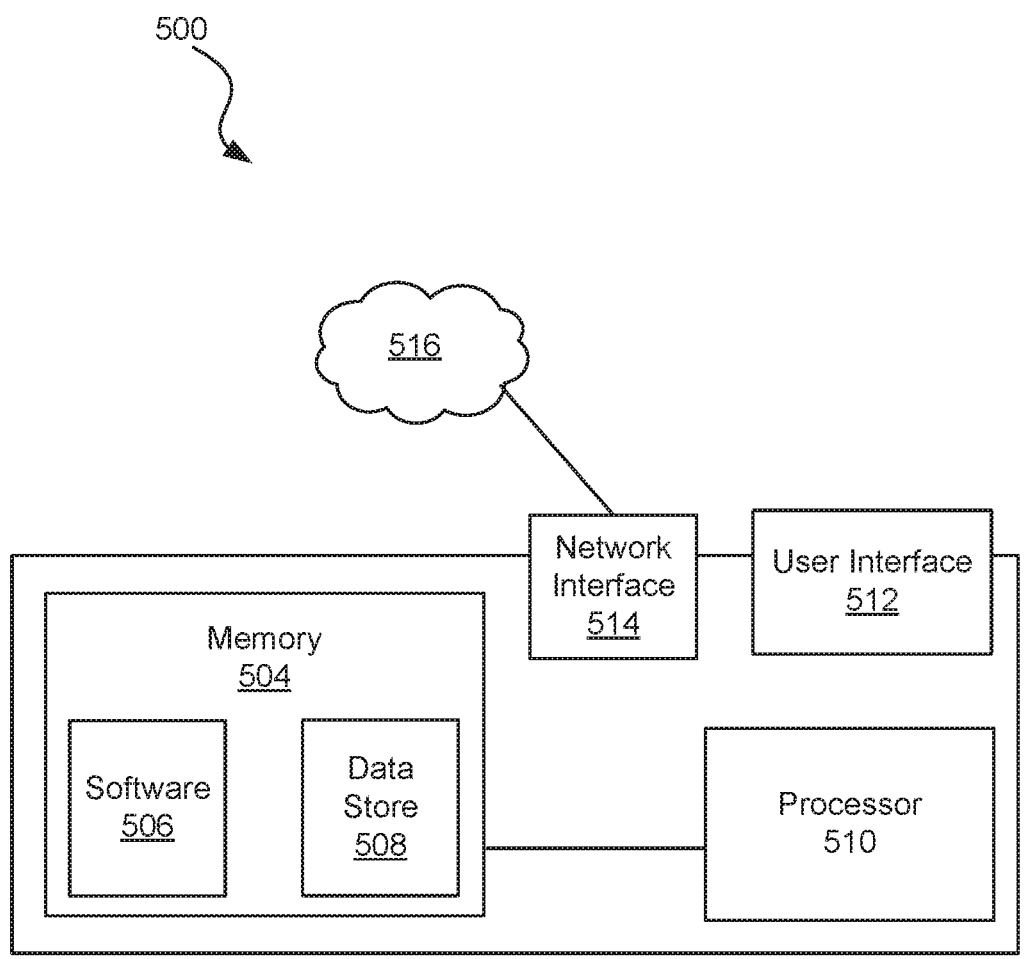
FIG. 5 is a diagram showing an illustrative computing system that may be used to perform the principles described herein.

FIG. 5 is a diagram showing an illustrative computing system that may be used to perform the principles described herein. For example, the computing system 500 may be used to perform the functions performed in methods 300 and 400. Other functions described herein may also be performed by computing systems such as computing system 500. According to certain illustrative examples, the computing system 500 includes a memory 504 which may include software 506 and a data store 508. The processing system 500 also includes a processor 510, a network interface 514, and a user interface 512.

The memory 504 may be one of several different types of memory. Some types of memory, such as solid-state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software 506 and data in the data store 508.

The computing system 500 also includes a processor 510 for executing the software 506 and using or updating the data 508 stored in memory 504. The software 506 may include an operating system and any other software applications a user may wish to install. In some examples, the computing system 500 may be associated with a user. In such case, the software 506 may be an application to render web content, such as a browser. The software 506 may include machine readable instructions of a computer program product that when executed, perform the functions described above.

The user interface 512 may include a number of input devices such as a mouse, touchpad, or touchscreen that allow the user to interact with the computing system 500. The user interface 512 may also include a number of different types of output devices such as a monitor or a touchscreen. The user interface allows the user to interact with the processing system 500 in a manner as described above.

The network interface 514 may include hardware and software that allows the processing system 500 to communicate with other processing systems over a network 516. The network interface 514 may be designed to communicate with the network 516 through hardwire media such as Ethernet, coaxial, fiber-optic, etc. The network interface 514 may also be designed to communicate with the network 516 using wireless technologies.

Some examples of processing systems described herein may include non-transitory, tangible, machine readable media that include executable code that when run by one or more processors may cause the one or more processors to perform the processes of methods as described above. Some common forms of machine-readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a computing system, the method comprising:
   with a privileged component of the computing system, loading patching code to a region of memory;
   in relation to executing the patching code, switching from a first set of page tables to a second set of page tables, wherein the second set of pages tables is configured such that only the patching code is executable and privileged memory is writable; and
   executing the patching code to update code stored in the privileged memory subject to a predefined set of constraints.

2. The method of claim 1, wherein the switching occurs before the patching code is executed.

3. The method of claim 1, wherein the switching occurs in response to executing the patching code.

4. The method of claim 1, wherein the patching code is designated as the patching code by a compiler.

5. The method of claim 1, wherein the updating includes inserting at least one of: a jump label and a tracepoint.

6. The method of claim 1, wherein the constraints include a set of memory address ranges within which modification is allowed, the set of memory address ranges being different than memory page regions.

7. The method of claim 1, wherein the constraints limit a type of update allowed.

8. The method of claim 1, wherein the constraints are stored in a protected data structure.

9. The method of claim 1, wherein after loading patching code to the region of memory, write-protecting the region of memory.

10. The method of claim 1, further comprising, returning to the first set of page tables after updating the code stored in memory.

11. A method comprising,
    with a privileged component of a computing system, loading patching code to a region of memory;
    providing executable access to the patching code while disabling executable access for all other code;
    while providing executable access to the patching code, providing write access to other portions of privileged memory;
    receiving a request from the patching code to update a portion of privileged code within the other portions of privileged memory; and
    validating that the request to update the portion of privileged code is valid.

12. The method of claim 11, wherein providing executable access to the patching code comprises switching to use of an alternative set of page tables.

13. The method of claim 12, wherein switching to the alternative set of page tables occurs before executing the patching code.

14. The method of claim 12, wherein switching to the alternative set of page tables occurs after executing the patching code has started.

15. The method of claim 11, wherein validating the request comprises determining that the request is to update code within a predefined memory range.

16. The method of claim 11, wherein validating the request comprises determining that the request is to update code by overwriting a NOP instruction.

17. The method of claim 11, wherein the request is to update the kernel code by adding at least one of: a jump label and a tracepoint.

18. A computing system comprising:
   a processor; and
   a memory comprising machine readable instructions that when executed by the processor cause the system to:
   load patching code to a region of memory;
   in relation to executing the patching code, switch from a first set of page tables to a second set of page tables, wherein the second set of pages tables is configured such that only the patching code is executable and privileged memory is writable; and
   execute the patching code to update code stored in the privileged memory subject to a predefined set of constraints.

19. The system of claim 18, wherein the switch from a first set of page tables to the second set of page tables occurs before the patching code is invoked.

20. The system of claim 18, wherein the switch from a first set of page tables to the second set of page tables occurs after the patching code is invoked.

\* \* \* \* \*